United States Patent
Yang (10) Patent No.: US 10,283,296 B2
(45) Date of Patent: May 7, 2019

(54) CONTROLLABLE CIRCUIT PROTECTOR FOR POWER SUPPLIES WITH DIFFERENT VOLTAGES

(71) Applicant: Chin-Chi Yang, Taichung (TW)

(72) Inventor: Chin-Chi Yang, Taichung (TW)

( * ) Notice: Subject to any disclaimer, the term of this patent is extended or adjusted under 35 U.S.C. 154(b) by 81 days.

(21) Appl. No.: 15/286,023

(22) Filed: Oct. 5, 2016

(65) Prior Publication Data

US 2018/0096807 A1 Apr. 5, 2018

(51) Int. Cl.
| | |
|---|---|
| *H01H 37/76* | (2006.01) |
| *H02H 3/087* | (2006.01) |
| *H01H 61/02* | (2006.01) |
| *H01H 85/046* | (2006.01) |
| *H01H 85/46* | (2006.01) |
| *H01M 2/34* | (2006.01) |

(52) U.S. Cl.
CPC .......... *H01H 37/761* (2013.01); *H02H 3/087* (2013.01); *H01H 61/02* (2013.01); *H01H 85/046* (2013.01); *H01H 85/463* (2013.01); *H01H 2085/466* (2013.01); *H01M 2/34* (2013.01)

(58) Field of Classification Search
CPC .... H01H 37/34; H01H 37/761; H01H 85/048; H01H 85/12; H01H 61/02; H01H 85/046; H01H 85/463; H01H 2085/466; H02H 3/087; H01M 2/34
USPC .......................................................... 337/412
See application file for complete search history.

(56) References Cited

U.S. PATENT DOCUMENTS

| | | | | |
|---|---|---|---|---|
| 4,635,023 A | * | 1/1987 | Oh ........................ | H01H 85/055 337/163 |
| 2010/0164677 A1 | * | 7/2010 | Yang .................. | H01H 85/0411 337/159 |
| 2013/0044402 A1 | * | 2/2013 | Mukai ................. | H01M 10/443 361/104 |
| 2013/0099890 A1 | * | 4/2013 | Yoneda ................ | H01H 37/761 337/416 |
| 2014/0061852 A1 | * | 3/2014 | Newberry ............ | H01H 85/046 257/529 |
| 2015/0015218 A1 | * | 1/2015 | Hu ......................... | G01R 31/40 323/234 |
| 2015/0017507 A1 | * | 1/2015 | Yang ..................... | H01M 2/204 429/121 |
| 2015/0200535 A1 | * | 7/2015 | Uesugi .................... | H02H 7/18 361/91.1 |

(Continued)

*Primary Examiner* — Jacob R Crum
(74) *Attorney, Agent, or Firm* — Withrow & Terranova, P.L.L.C.

(57) ABSTRACT

A controllable circuit protector for power supplies with different voltages includes a first fuse and a second fuse connected in series to each other, a first heating unit, and at least one second heating unit in parallel to the first heating unit. A connected end of the first heating unit is electrically connected to a series-connected node between the first fuse and the second fuse, and a free end thereof forms a control terminal. When a load is irregular, the control terminal is connected to a ground terminal through a switch. For power supplies with different voltages, the effective resistance of the first heating unit and a part of the at least one second heating unit not melting is altered without causing drastic change arising from voltage variation to the total heating power, and the first fuse or the second fuse can duly melt down to protect the load.

6 Claims, 8 Drawing Sheets

(56) References Cited

U.S. PATENT DOCUMENTS

2015/0303012 A1* 10/2015 Jung .................. H02H 7/18
                                                          337/414
2015/0364286 A1* 12/2015 Kang .................. H01H 83/20
                                                          337/227

* cited by examiner

CONTROLLABLE CIRCUIT PROTECTOR FOR POWER SUPPLIES WITH DIFFERENT VOLTAGES

BACKGROUND OF THE INVENTION

1. Field of the Invention

The present invention relates to a controllable circuit protector and, more particularly, to a controllable circuit protector for power supplies with different voltages.

2. Description of the Related Art

Figure 9:
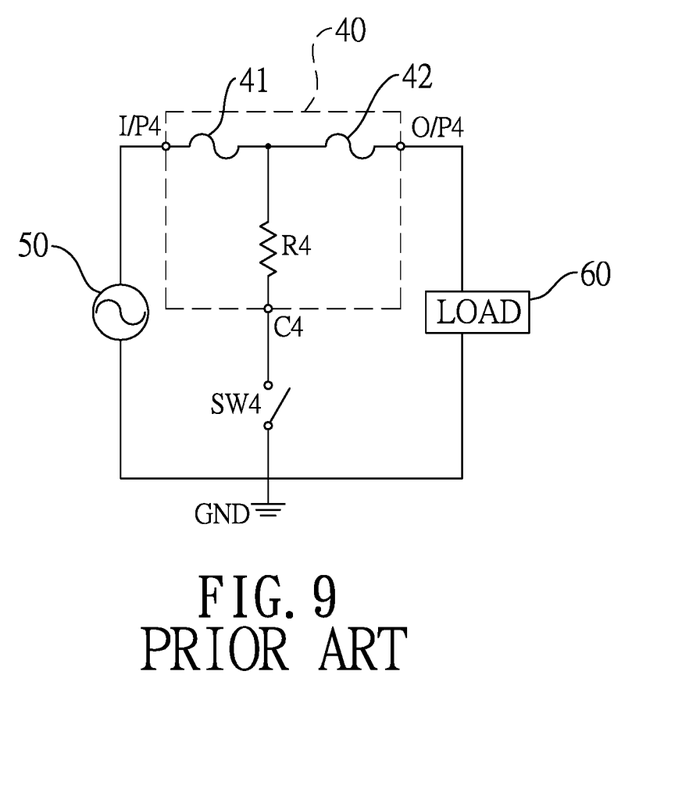
FIG. 9 is a circuit diagram of a conventional fuse device.

With reference to FIG. 9, a regular fuse device 40 includes an input terminal I/P4, an output terminal O/P4, a control terminal C4, a first thermal fuse 41, a second thermal fuse 42 and a heating resistor R4. The first thermal fuse 41 is connected in series to the second thermal fuse 42. A series-connected node between the first thermal fuse 41 and the second thermal fuse 42 is electrically connected to one end of the heating resistor R4. A free end of the first thermal fuse 41 forms the input terminal I/P4, a free end of the second thermal fuse 42 forms the output terminal O/P4, and a free end of the heating resistor R4 forms the control terminal C4.

When the fuse device 40 is in use, the input terminal I/P4 is electrically connected to a power supply 50, the output terminal O/P4 is electrically connected to a load 60, and the control terminal C4 is electrically connected to a ground terminal GND through a switch SW4.

The switch SW4 is controlled to connect or disconnect the control terminal C4 according to a condition of the load 60. When the load 60 is in an abnormal state, the switch SW4 is controlled to connect to the control terminal C4 and the free end of the heating resistor R4 is connected to the ground terminal GND. Meanwhile, power supplied by the power supply 50 passes through the heating resistor R4 to heat up the heating resistor R4. The temperature rise of the heating resistor R4 causes the first thermal fuse 41 or the second thermal fuse 42 to melt.

The temperature rising speed of the heating resistor R4 is determined by the heating power of the heating resistor R4. After the temperature of the heating resistor R4 exceeds the meltdown temperature of the first thermal fuse 41 or the second thermal fuse 42, meltdown of the first thermal fuse 41 or the second thermal fuse 42 then happens. An equation for calculating the heating power of the heating resistor R4 is expressed as follows:

$$P = \frac{V^2}{R}$$

where P is the heating power of the heating resistor R4; V is the voltage value provided by the power supply 50; and R is the resistance value of the heating resistor R4.

When the load is detected to be at an abnormal state, the first thermal fuse 41 or the second thermal fuse 42 must melt down within a specific period of time before it is too late to protect the load 60. Hence, when the resistance value R of the heating resistor R4 is a fixed value, the time for melting down the first thermal fuse 41 or the second thermal fuse 42 is positively correlated with the heating power P of the heating resistor R4. When the heating power P of the heating resistor R4 increases, the time for melting down the first thermal fuse 41 or the second thermal fuse 42 is shortened or is negatively correlated with the heating power P of the heating resistor R4. Also, the heating power P of the heating resistor R4 is positively correlated with the square of the voltage value V provided by the power supply 50. Therefore, the meltdown time of the first thermal fuse 41 or the second thermal fuse 42 is negatively correlated with the square of the voltage value V provided by the power supply 50.

In other words, when the voltage value V provided by the power supply increases, the meltdown time of the first thermal fuse 41 or the second thermal fuse 42 is shortened.

However, when manufacturers of the regular fuse device 40 produce the fuse device 40, same type of heating resistors R4 is used exclusively. In other words, the resistance value R of the heating resistor R4 is a fixed value. Thus, the fuse device 40 is only applicable to the power supplies at a specific voltage value and up. When the voltage value V of the power supply 50 is lower than the specific voltage value and the load 60 is at an abnormal state, the switch SW4 connects the control terminal C4, the first thermal fuse 41 or the second thermal fuse 42 has a long meltdown time arising from the lower heating power P of the heating resistor R4 and thus fails to melt down in time to protect the load 60, and the cost is damage to the load 60.

For example, when the fuse device 40 manufactured is applied to the power supply 50 at 220V, the load 60 is at an abnormal state and the switch SW4 connects to the control terminal C4, the voltage value 220V of the power supply 50 heats up the heating resistor R4 for the first thermal fuse 41 or the second thermal fuse 42 to have timely meltdown. However, when the fuse device 40 is applied to the power supply 50 at 110V and the switch SW4 connects to the control terminal C4, the voltage value 110 of the power supply 50 results in a reduced heating power P at the heating resistor R4, such that the first thermal fuse 41 or the second thermal fuse 42 fails to melt down in time because of prolonged meltdown time of the first thermal fuse 41 or the second thermal fuse 42 and the prolonged meltdown time also causes damage to the load 60.

As a result, the fuse device 40 made for 220V power supply is unable to be used for 110V power supply. Suppose that the fuse device 40 needs to be used with 110V power supply. Manufacturers must redesign the heating resistor R4 in the fuse device 40 with a different resistance value, meaning that the fuse device must be rebuilt. To manufacturers of the fuse device, different fuse devices dedicated to power supplies with different voltage values relatively increase the cost in production. As current power equipment is operated in a working range of 90~260V, the regular fuse device 40 fails to meet the requirement, does not work with AC (Alternating Current) power supplies, and can only work with DC (Direct Current) power supplies under 30V.

SUMMARY OF THE INVENTION

An objective of the present invention is to provide a controllable circuit protector for power supplies with different voltages, which is a cost-effective solution that requires no need for development of different fuse devices to ensure protection for power supplies with different voltages.

To achieve the foregoing objective, the controllable circuit protector for power supplies with different voltages includes a first fuse, a second fuse, a first heating unit and at least one second heating unit.

The second fuse is connected in series to the first fuse. A free end of the first fuse forms an input terminal, and a free end of the second fuse forms an output terminal.

The first heating unit has a connected end and a free end. The connected end is electrically connected to a series-connected node between the first fuse and the second fuse. The free end is opposite to the connected end and forms a control terminal.

The at least one second heating unit is connected in parallel to the first heating unit.

During operation, the input terminal and the output terminal of the controllable circuit protector are respectively electrically connected to a power supply and a load, and the control terminal of the controllable circuit protector is electrically connected to a ground terminal through a switch.

When the load is detected to be irregular, the switch is turned on and the control terminal is electrically connected to the ground terminal. Meanwhile, the parallelly-connected first heating unit and the at least second heating unit, the power supply and the first fuse form a circuit loop. Depending on the voltage value provided by the power supply, all of a part of the at least one second heating unit will melt down to break the circuit loop, or all of the at least one second heating unit does not melt down, for the first heating unit and the part of the at least one second heating unit not melting down to be connected in parallel. Thus, the effective resistance of the first heating unit and the part of the at least one second heating unit not melting down is altered and the total heating power does not vary with the number of the part of the at least one second heating unit not melting down. As such, when the voltage of the power supply varies, the effective resistance also varies and there is no drastic change to the total heating power because of the voltage variation of the power supply, and the first fuse or the second fuse can duly melt down to protect the load.

As the number of the part of the at least one second heating unit not melting down is determined by the voltage of the power supply, the total heating power varies with the voltage variation of the power supply in a slow degree. Accordingly, the controllable circuit protector can be applied to power supplies with different voltages to reduce the production cost of the manufacturers of fuse equipment.

Other objectives, advantages and novel features of the invention will become more apparent from the following detailed description when taken in conjunction with the accompanying drawings.

DETAILED DESCRIPTION OF THE INVENTION

Figure 1:
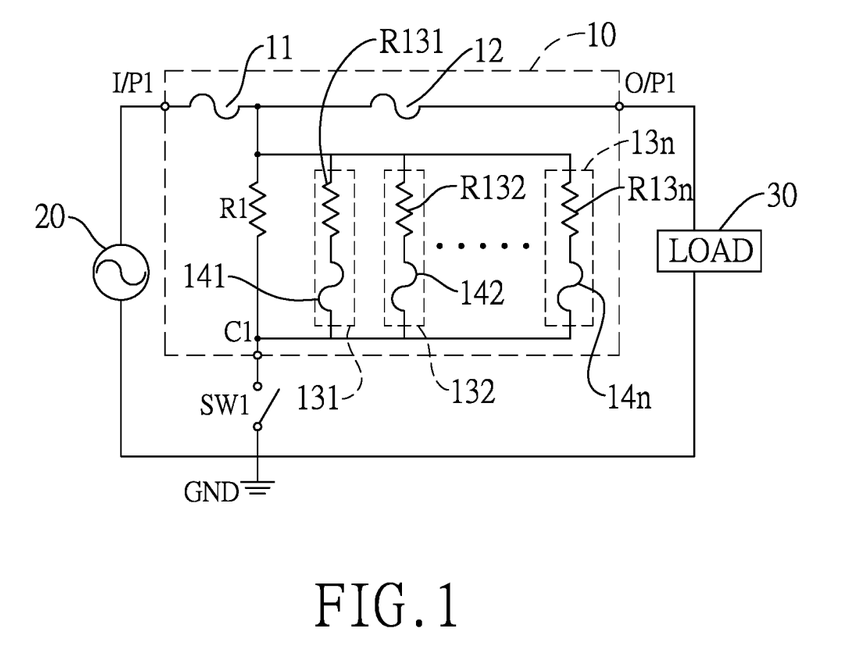
FIG. 1 is a circuit diagram showing a generalized circuit model of a controllable circuit protector for power supplies with different voltages in accordance with the present invention.

With reference to FIG. 1, a controllable circuit protector for power supplies with different voltages 10 in accordance with the present invention can work with power supplies at various voltage values and includes a first fuse 11, a second fuse 12, a first heating unit R1 and at least one second heating unit 131~13n.

The second fuse 12 is connected in series to the first fuse 11. A free end of the first fuse 11 forms an input terminal I/P1, and a free end of the second fuse 12 forms an output terminal O/P1. In the present embodiment, the first fuse 11 and the second fuse 12 are low-temperature alloy fuses.

A connected end of the first heating unit R1 is electrically connected to a series-connected node between the first fuse 11 and the second fuse 12. A free end of the first heating unit R1 opposite to the connected end forms a control terminal C1. In the present embodiment, the first heating unit R1 is a heating resistor or a heating device.

The at least one second heating unit 131~13n is connected in parallel to the first heating unit R1. Each one of the at least one second heating unit 131~13n includes a second heating element R131~R13n and an auxiliary fuse 141~14n. The at least one second heating element R13~R13n is connected in series to the respective auxiliary fuse 141~14n. In the present embodiment, the at least one second heating element R131~R13n is a heating resistor or a heating device. A breaking capacity or a current withstand capacity of the auxiliary fuse 141~14n of each one of the at least one second heating unit 131~13n is less than that of the first fuse 11 or the second fuse 12. Besides, the at least one auxiliary fuse 141~14n of the at least one second heating unit 131~13n has different breaking capacities.

When the controllable circuit protector is in use, the input terminal I/P1 is electrically connected to a power supply 20, the output terminal O/P1 is electrically connected to a load 30, and the control terminal C1 of the first heating unit R1 is connected to a ground terminal GND.

As the first fuse 11 and the second fuse 12 are directly connected between the power supply 20 and the load 30, when voltage supplied by the power supply 20 is irregular, the first fuse 11 or the second fuse 12 will melt down because of the current arising from the irregular voltage supplied by the power supply 20, such that the load 30 is not affected by the irregular voltage. Hence, the first fuse 11 and the second fuse 12 also have common features of regular fuses.

When the load 30 is detected to be abnormal, regardless of whether the voltage supplied by the power supply is abnormal, a control command is generated to turn on the switch SW1 to connect the control terminal C1 to the ground terminal GND. Thus, the parallelly-connected first heating unit R1 and the at least one second heating unit 131~13n, the power supply 20 and the first fuse 11 form a circuit loop. Depending on the voltage value of the power supply 20, all or a part of the at least one auxiliary fuse 141~14n of the at least one second heating unit 131~13n will melt down to break the circuit loop or all of the at least one second heating unit 131~13n will not melt down. Then, the first heating unit R1 and the part of the at least one second heating unit 131~13n not melting down are connected in parallel to alter the effective resistance of the first heating unit R1 and the at least one second heating unit 131~13n. Upon calculation of a total heating power of the first heating unit R1 and the at least one second heating unit 131~13n, the total heating power depends on the effective resistance and the voltage of the power supply 20. As we know, the total heating power varies with the number of the at least one second heating unit 131~13n not melting down. When the voltage of the power supply 20 varies, the effective resistance also varies. In view of such simultaneous change, there is no drastic change to the total heating power due to variation of the voltage of the power supply 20. Accordingly, the first fuse 11 or the second fuse 12 can melt down at the right moment.

Besides, as the breaking capacity of the at least one auxiliary fuse 141~14n of the at least one second heating unit 131~13n is lower than that of the first fuse 11 or the second fuse 12, even though the first fuse 11 or the second fuse 12 does not melt down because the voltage supplied by the power supply 20 is not abnormal, a part of the at least one auxiliary fuse 141~14n of the at least one second heating unit 131~13n will melt down first when the switch SW1 is turned on. After current passes through the first heating unit R1 and the part of the at least one second heating unit 131~13n not melting down to cause temperature rise, heat generated by the first heating unit R1 and the part of the at least one second heating unit 131~13n not melting down will cause the first fuse 11 and the second fuse 12 to melt down to protect the load 30.

Given the foregoing design of the present invention, when the switch SW1 is turned on upon irregularity of the load 30, the magnitude of the voltage of the power supply 20 determines the number of the at least one auxiliary fuse 141~14n of the at least one second heating unit 131~13n melting down. Thus, the effective resistance of the parallelly-connected first heating unit R1 and the at least one second heating unit 131~13n is altered and the heating power of the parallelly-connected first heating unit R1 and the at least one second heating unit 131~13n is altered as well to prevent the melt-down time of the first fuse 11 or the second fuse 12 from being changed by the voltage of the power supply 20. Since the total heating power is not susceptible to the variation of voltage of the power supply 20, the controllable circuit protector can be adapted to power supplies with various voltage values to save production cost of the manufacturers.

Figure 2:
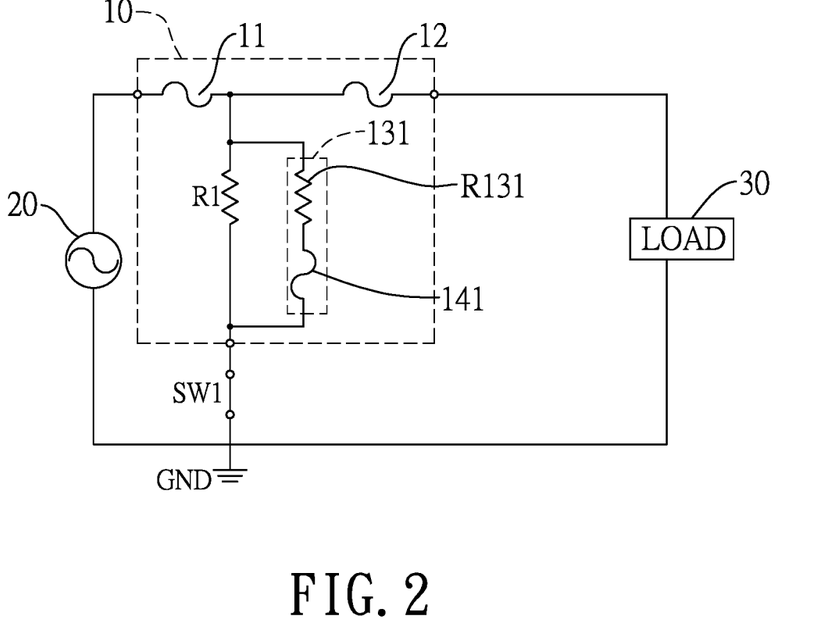
FIGS. 2 and 3 are operational circuit diagrams of a first embodiment of the controllable circuit protector in FIG. 1.
Figure 3:
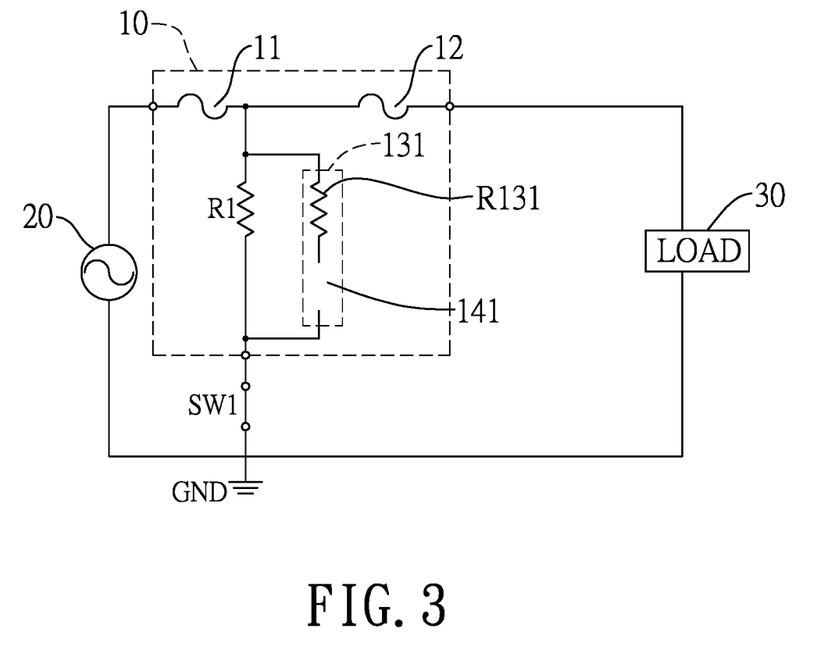

Given an example for fulfillment of the present invention, with reference to FIGS. 2 and 3, the number of the at least one second heating unit 131~13n is one, the resistance of the first heating unit R1 is 910Ω, and the second heating element R131 of the second heating unit 131 is 300Ω.

With reference to FIG. 2, when the controllable circuit protector 10 is applied to a circuit configuration with the power supply 20 at 110V and the irregularity of the load 30 causes the switch SW1 to turn on, the auxiliary fuse 141 of the second heating unit 131 does not melt down. The effective resistance and the total heating power can be calculated as follows.

$$\text{Effective resistance} = \frac{910 \times 300}{910 + 300} = 225.61 \ \Omega$$

$$\text{Total heating power} = \frac{110^2}{225.61} = 53.63 \ W$$

The effective resistance of the first heating unit R1 and the second heating unit 131 is equal to 225.61Ω, and the total heating power is equal to 53.63 W.

With reference to FIG. 3, when the controllable circuit protector 10 is applied to a circuit configuration with the power supply 20 at 220V and the irregularity of the load 30 causes the switch SW1 to turn on, the auxiliary fuse 141 of the second heating unit 131 melts down. The effective resistance and the total heating power can be calculated as follows.

$$\text{Effective resistance} = 910 \ \Omega$$

$$\text{Total heating power} = \frac{220^2}{910} = 53.18 \ W$$

The effective resistance of the first heating unit R1 and the second heating unit 131 is equal to the resistance 910Ω of the first heating unit R1 since the auxiliary fuse 141 of the second heating unit 131 also melts down, and the total heating power is calculated to be 53.18 W accordingly.

It can be seen from the foregoing example, when the controllable circuit protector 10 is applied to circuit configurations with the power supply 20 operated in different voltages, the total heating powers are close to each other without drastic change arising from voltage variation of the power supply 20. Accordingly, the meltdown time of the first fuse 11 or the second fuse 12 can be stably controlled to melt down for protection of the load 30.

Figure 4:
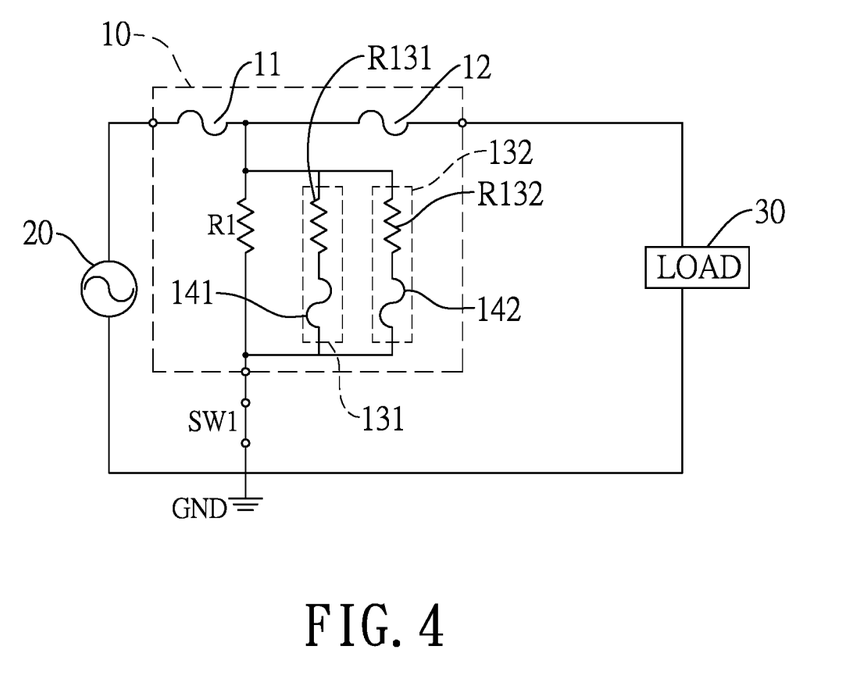
FIGS. 4 to 6 are operational circuit diagrams of a second embodiment of the controllable circuit protector in FIG. 1.
Figure 5:
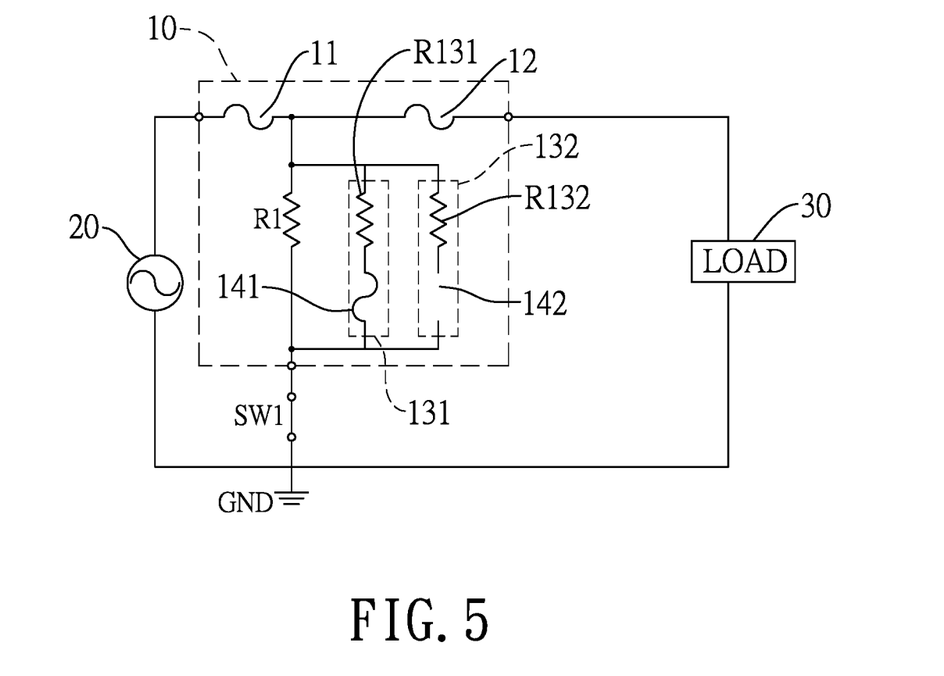
Figure 6:
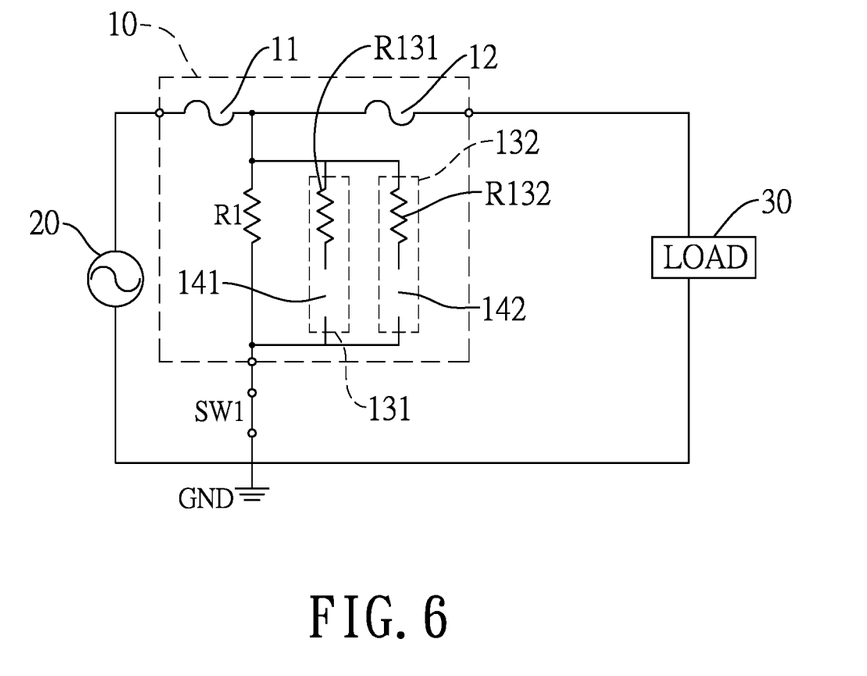

Given another example for fulfillment of the present invention, with reference to FIGS. 4 to 6, the number of the at least one second heating unit 131~13n is two, the resistance of the first heating unit R1 is 1050Ω, the resistance of the second heating element R131 of one of the two second heating units 131 is 1000Ω, and the resistance of the second heating element R132 of the other second heating unit 132 is 480Ω.

With reference to FIG. 4, when the controllable circuit protector 10 is applied to a circuit configuration with the power supply 20 at 110V and the irregularity of the load 30 causes the switch SW1 to turn on, the auxiliary fuses 141, 142 of the two second heating units 131, 132 do not melt down. The effective resistance and the total heating power can be calculated as follows.

$$\text{Effective resistance} = \frac{1050 \times 1000 \times 480}{1000 \times 480 + 1050 \times 480 + 1050 \times 1000} = 247.78 \ \Omega$$

$$\text{Total heating power} = \frac{110^2}{247.78} = 48.83 \ W$$

The effective resistance of the first heating unit R1 and the second heating units 131, 132 is equal to 247.78Ω, and the total heating power is equal to 48.83 W.

With reference to FIG. 5, when the controllable circuit protector 10 is applied to a circuit configuration with the power supply 20 at 165V and the irregularity of the load 30 causes the switch SW1 to turn on, the auxiliary fuse 142 of the other second heating unit 131 melts down. The effective resistance and the total heating power can be calculated as follows.

$$\text{Effective resistance} = \frac{1050 \times 1000}{1050 + 1000} = 512.19 \ \Omega$$

$$\text{Total heating power} = \frac{165^2}{512.19} = 53.15 \ W$$

The effective resistance of the first heating unit R1 and the other second heating unit 131 is equal to 512.19Ω since the auxiliary fuse 142 of the other second heating unit 132 also melts down, and the total heating power is calculated to be 53.15 W accordingly.

With reference to FIG. 6, when the controllable circuit protector 10 is applied to a circuit configuration with the power supply 20 at 220V and the irregularity of the load 30 causes the switch SW1 to turn on, the auxiliary fuses 141, 142 of the two second heating units 131, 132 both melt down. The effective resistance and the total heating power can be calculated as follows.

$$\text{Effective resistance} = 1050 \ \Omega$$

$$\text{Total heating power} = \frac{220^2}{1050} = 46.09 \ W$$

The effective resistance of the first heating unit R1 and the second heating units 131, 132 is equal to 1050Ω since the auxiliary fuses 141, 142 of the second heating units 131, 132 melt down, and the total heating power is calculated to be 46.09 W accordingly.

From the foregoing description, the controllable circuit protector 10 can be applied to power supplies operated at different voltages without causing drastic change to the total heating power.

Figure 7:
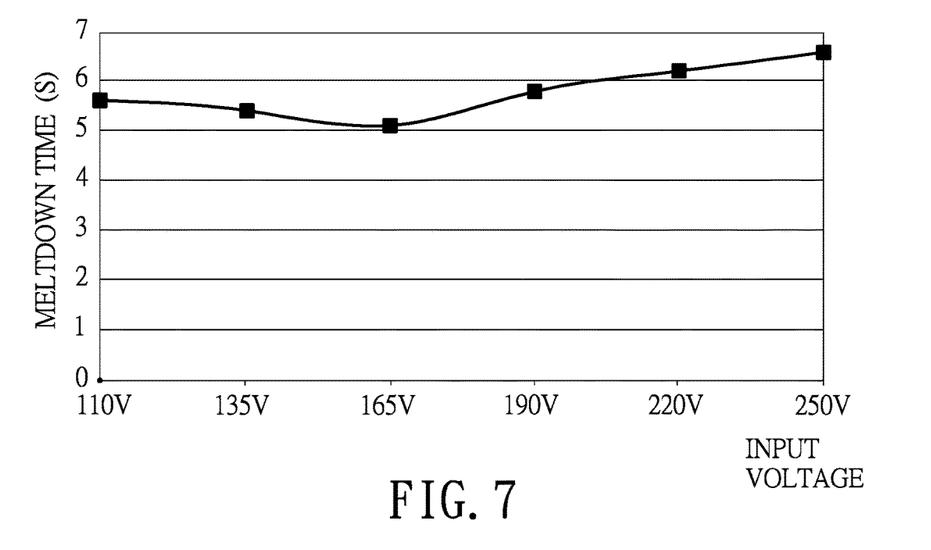
FIG. 7 is a curve graph showing relationship between input voltage and fuse meltdown time of the controllable circuit protector in FIG. 1.
Figure 8:
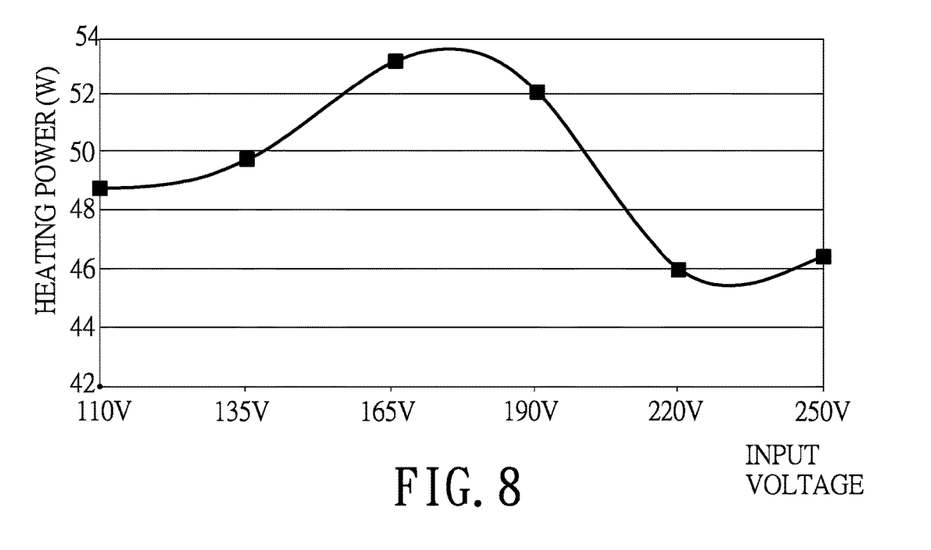
FIG. 8 is a curve graph showing relationship between input voltage and resistor's heating power of the controllable circuit protector in FIG. 1.

With reference to FIGS. 7 and 8, when the number of the at least one second heating unit 131~13n is five, the controllable circuit protector 10 can be applied to the power supply 20 operated at six different voltages. As shown in FIG. 7, under application of six different input voltages, the meltdown time of the first fuse 11 or the second fuse 12 can be stably maintained in a range of 5~7 seconds. With reference to FIG. 8, under application of six different input voltages, the total heating power can be stably maintained in a range of 45~54 W. Therefore, the controllable circuit protector in accordance with the present invention can be indeed applied to the power supply 20 with different input voltages. Upon irregularity of the load 30, the first fuse 11 or the second fuse 12 can duly melt down to protect the load 30.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A controllable circuit protector for power supplies with different voltages, comprising:
   a first fuse;
   a second fuse connected in series to the first fuse, wherein a free end of the first fuse forms an input terminal and is adapted to connect to a power supply, and a free end of the second fuse forms an output terminal;
   a first heating unit having:
      a connected end electrically connected to a series-connected node between the first fuse and the second fuse; and
      a free end being opposite to the connected end and forming a control terminal;
   a switch connected to the control terminal of the first heating unit and a ground terminal; and
   at least one second heating unit connected in parallel to the first heating unit, each one of the at least one second heating unit having:
      a second heating element; and
      an auxiliary fuse connected in series to the second heating element, wherein a breaking capacity of the auxiliary fuse of each one of the at least one second heating unit is less than that of the first fuse or the second fuse, and differs from the breaking capacity of each other auxiliary fuse;
   wherein when the switch is turned on to connect the control terminal of the first heating unit to the ground terminal, a number of the auxiliary fuse of the at least one second heating unit melts down, the number depending on a voltage value of the power supply,
   the first heating unit and the second heating element of the at least one second heating unit with the auxiliary fuse not melted down have an effective resistance; and
   a total heating power of the first heating unit and the at least one second heating unit is determined by the voltage value and the effective resistance to melt down the first fuse or the second fuse in a meltdown time.

2. The controllable circuit protector as claimed in claim 1, wherein the first fuse and the second fuse are alloy fuses.

3. The controllable circuit protector as claimed in claim 1, wherein the first heating unit is one of a heating resistor and a heating device.

4. The controllable circuit protector as claimed in claim 1, wherein the second heating element of each one of the at least one second heating unit is one of a heating resistor and a heating device.

5. The controllable circuit protector as claimed in claim 2, wherein the second heating element of each one of the at least one second heating unit is one of a heating resistor and a heating device.

6. The controllable circuit protector as claimed in claim 3, wherein the second heating element of each one of the at least one second heating unit is one of a heating resistor and a heating device.

* * * * *